April 5, 1955

W. A. SHURCLIFF 2,705,757

RADIATION DETECTION DEVICES

Filed June 2, 1951

INVENTOR
William A. Shurcliff
BY
Brown and Mikulka
ATTORNEYS

_United States Patent Office_

2,705,757
Patented Apr. 5, 1955

2,705,757

RADIATION DETECTION DEVICES

William A. Shurcliff, Cambridge, Mass., assignor to Polaroid Corporation, Cambridge, Mass., a corporation of Delaware Application June 2, 1951, Serial No. 229,612

3 Claims. (Cl. 250—71)

This invention relates to photographic apparatus and more particularly to products which enable conventional cameras to detect and measure electromagnetic radiation of the kind emanating from X-ray machines or from radioactive or fissionable materials.

An object of the present invention is to provide means for converting a camera into a radiation-detecting and measuring means without interfering with the normal use of said camera for photographic purposes.

Other objects of the present invention are to provide a camera with an intensifier which operates to expose the sheet of photosensitive material within the camera in the presence of small amounts of short-wave radiation; to provide means for giving a definite indication of the presence of radioactivity despite fogging of the photosensitive material by reason of overage film, light leakage, etc.; to provide novel means for supporting an intensifier; and to provide a novel combination of an intensifier and a camera wherein a sheet of photosensitive material within said camera may be developed quickly by the use of means carried by said camera to give a quick indication of incident radiation.

These and other objects of the present invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figures 1, 2, 3, 4:
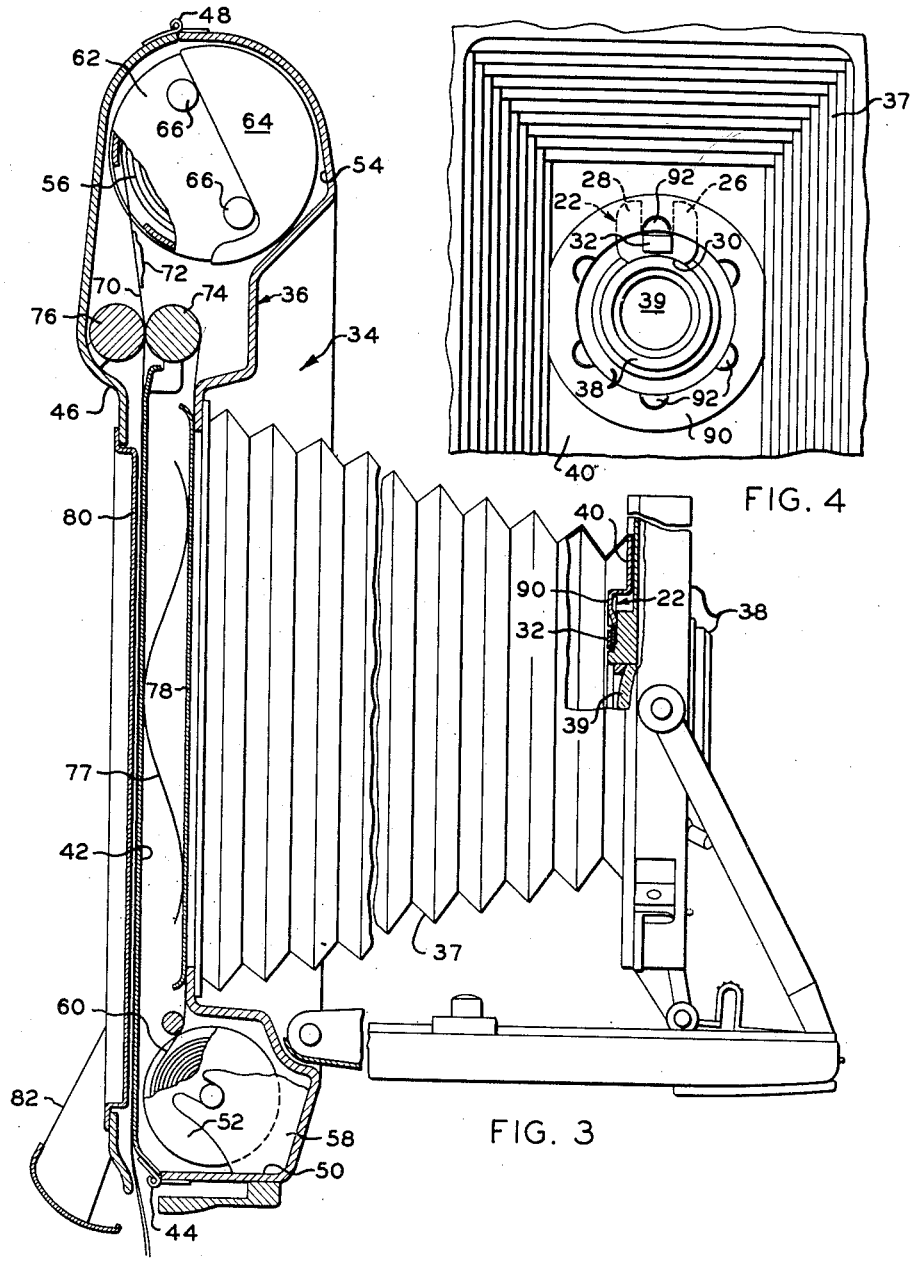
Figure 1 is a plan view of an intensifier embodying the present invention.
Fig. 2 is a side view of the intensifier of Fig. 1.
Fig. 3 is a diagrammatic cross-sectional view of one preferred camera in which the present invention may be embodied, with parts thereof omitted and parts thereof broken away.
Fig. 4 is a rear elevation view of the camera of Fig. 3, with the inner partition and outer cover of said camera in open position, showing the lens and bellows through the open back of said camera.

The present invention is particularly concerned with the detection of short-wave electromagnetic radiation lying within a wavelength range of .2 Å unit to .002 Å unit, it being noteworthy that X-rays and gamma rays are within this range. The term "dose" has reference to quantity of radiation and is measured in roentgens or $r$.

Photosensitive materials, in addition to being sensitive to light, generally are sensitive also to short-wave radiation of the kind emanating from radioactive or fissionable materials. An example of such a photosensitive material is a heavy metal salt, such as silver halide, which is capable, upon photoexposure, of having formed therein a latent image which is developable to the metal of the salt to provide a visible image. Such photosensitive materials, however, are ordinarily not appreciably exposed by short-wave radiation doses having only an order of magnitude of 0.5 $r$. Such a small dose would result in an exposure undiscernible from fogging by reason of old age, light leakage, etc. The present invention contemplates providing a camera with a short-wave radiation intensifying means which, when struck by incident radiation of an intensity incapable by itself of effectively exposing the photosensitive materials within said camera, will emit fluorescent light having an appreciable effect on said photosensitive materials. The intensifying means of the present invention, by producing a light spot on a dark background, which light spot is patently attributable only to X- or gamma radiation, provides a differential indication which distinguishes fogging due to overage film or light leakage from exposure to X- or gamma rays.

The aforementioned intensifier is particularly useful in cameras of the kind described in detail in Patent No. 2,538,511, issued to Murry N. Fairbank on January 16, 1951, for Photographic Apparatus. Since a camera of the aforementioned kind enables the image-receiving area of a photosensitive sheet exposed therein to be developed immediately after exposure, when provided with an intensifier of the aforementioned type it constitutes a valuable means for determining the intensity of a radiation dose during or immediately after exposure to said radiation dose.

Briefly, the camera herein disclosed comprises means for holding a first sheet of photosensitive film, said photosensitive film comprising a silver halide layer, means for exposing said first sheet and means for processing said first sheet within said camera, said processing being accomplished by the spreading of a processing liquid between said first sheet and a second sheet also positioned within said camera. The second sheet supports a plurality of processing liquid containers at spaced intervals on one surface thereof. This surface is brought substantially into contact with the photosensitive layer of said first sheet and the two superposed sheets are passed between a pair of pressure-applying members to cause the release and spreading of the processing liquid. The result of this procedure is to develop a latent image formed on an image area of said first sheet to silver and to form on said image area a soluble silver complex from unexposed silver halide. This complex, at least in part, may be transferred by imbibition to the image area of the second sheet where it may be developed to silver to provide a positive image.

The photographic process and various species of first and second sheets, herein referred to, are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of first or second sheets, the terms "first sheet" and "second sheet" being used in their broadest sense to indicate a first sheet which is photosensitive and a second sheet which, merely, may aid in spreading the processing liquid over the surface of the first sheet or which may, if desired, possess other characteristics.

The intensifier of Figure 1, generally designated by 20, is a preferred embodiment of the present invention. The purpose of intensifier 20 is to emit actinic fluorescent light when a camera, in which it has been placed, is being subjected to an X- or gamma radiation dose of an intensity too small, in itself, to appreciably expose a sheet of photosensitive material. Intensifier 20 comprises a support 22 which includes yoke 24 and legs 26 and 28. Support 22 is composed of a material such as black pressboard which is photochemically inert and free from any trace of radioactivity. Outer edge 30 of yoke 24 is concavely curved with respect to inner edge 31 to prevent blocking of the lens of a camera by the support 22 when said intensifier is placed adjacent to said lens. Mounted on yoke 24, as by means of a vinyl seal adhesive which is photochemically inert and free from any trace of radioactivity, is block 32 of a fluorescent material of the type commonly used in intensifying X-rays, such as terphenyl, stilbene or the product sold under the trade name "Radelin" by U. S. Radium Corporation.

Intensifier 20 is particularly useful in a camera of the type shown in Fig. 3 and now to be described. Camera 34 comprises, generally, a housing 36, a bellows 37, a lens and shutter mechanism casing 38, a lens 39 (Fig. 4) and a mounting plate 40 which is fastened to one end of bellows 37 and which mounts casing 38. Housing 36 and bellows 37 define a main chamber, the back of which is open and in which first and second sheets of the kind previously described are positioned for exposure and development. Inner partition 42, pivoted at 44, and outer cover 46, pivoted at 48, when in closed position serve to transform the open-backed main chamber into a lighttight photographic exposure chamber, which provides an optical path between the lens 39 and the focal surface of said lens.

Housing 36 contains compartment 50 for retaining a first roll 52 and a compartment 54 for retaining a second roll 56. First roll 52 is trunnioned on a pair of brackets 58, one of which is shown in Fig. 3, and comprises a first sheet 60 of photosensitive material. Second roll 56 is rotatably contained in container 62 which, in turn, is mounted on brackets 64, one of which is shown in Fig. 3. Abutments 66, on both ends of container 62, engage brackets 64 to prevent rotation of said container 62. Second roll 56 comprises second sheet 70 which carries a plurality of processing liquid containers 72.

Pressure members 74 and 76 are adapted to exert pressure on opposite sides of first and second sheets superposed therebetween to rupture the processing liquid container 72 and to spread the processing liquid between said first and second sheets. First pressure member or roller 74 is mounted on inner partition 42 and second pressure member or roller 76 is mounted on outer cover 46, pressure members 74 and 76 being arranged to coact with each other when the inner partition and outer cover are in closed position. Partition 42, by means of leaf spring 77, resiliently mounts backing plate 78 which positions first sheet 60 substantially in the focal surface of the camera. The adjacent walls of the inner partition 42 and outer cover 46 define a dark chamber which protects first and second sheets enclosed therein from actinic light during a predetermined processing period following passage of said sheets between the pressure members.

Door 80 is provided in outer cover 46 for access to the superposed sheets within the dark chamber formed by adjacent surfaces of the inner partition and outer cover. Swinging cutter blade 82 is hingedly mounted on cover 46 to enable an operator to sever superposed sheet portions, which have been drawn from the dark chamber, from the remainder of the sheets comprising the first and second rolls 52 and 56. Suitable light seals are provided.

In the normal operation of camera 34 and with particular reference to Fig. 3 (the operation of intensifier 20 being reserved for later discussion), the outer cover 46 and inner partition 42 are swung open to permit loading of the first and second rolls 52, 56 in the first and second roll-retaining compartments 50, 54, respectively. First sheet 60 is drawn across backing plate 78 and around pressure member 74. Partition 42 is rotated to closed position and second sheet 70 is brought substantially into contact with first sheet 60, the superposed first and second sheets then being drawn as a unit along the outer surface of inner partition 42 until their free ends extend beyond the pivoted end of inner partition 42. The outer cover 46 is now closed. The superposed first and second sheets are now drawn until the first sheet is properly positioned for exposure with its image-receiving area in the focal surface of lens 39. Proper positioning of said image-receiving area is preferably accomplished by means of a stop (not shown) which engages apertures (not shown) in either or both of the first or second sheets. At this point, all excess superposed first and second sheet portions projecting from the dark chamber between said inner partition and outer cover may be cut off by means of cutter blade 82. Exposure is made and the superposed first and second sheets are again drawn from the dark chamber between said inner compartment and outer cover, as before. During the drawing procedure, the passage of processing liquid container 72 between pressure members 74 and 76 increases the hydraulic pressure in said container 72 to a point at which the processing liquid is forced out of the trailing edge of said container. As the drawing procedure continues, the liquid is spread between the first and second sheets in a thin layer, the processing liquid acting to bond the first and second sheets together and to carry out the formation of a positive image on the image-receiving area of second sheet 70, which is in coincidence with the exposed image-receiving area of the first sheet 60. After a predetermined processing time, the formation of the positive image is completed and door 80 may be opened to allow the operator to rip the developed image-receiving area of second sheet 70 from the remainder of the second sheet, this ripping being aided by perforations which separate the image-receiving area of second sheet 70 from the remainder of second sheet 70, and at the same time to peel it from the first sheet.

Fig. 4 shows how the intensifier 20 of Figs. 1 and 2 may be positioned within the camera of Fig. 3 so that normal photographic operation of the camera will not be interfered with when the bellows 37 is expanded, and so that the intensifier will be positioned closely adjacent the first sheet 60 when the bellows 37 is contracted. The lens and shutter mechanism casing 38 is supported on mounting plate 40 which, in turn, is attached to an end of bellows 37. Mounting plate 40 comprises flat peripheral portion 88 and inner cupped-out portion 90. Viewing Fig. 4, cupped-out portion 90 is cupped upwardly from the plane of the drawing toward the reader. Cupped-out portion 90 is fastened to lens and shutter mechanism assembly 38 by means of dimples 92, the non-contacting areas of the adjacent surfaces of assembly 38 and mounting plate 40 being spaced from each other to provide vents for the passage of air into the main chamber when the bellows 37 is being expanded. Legs 26 and 28 of intensifier support 22 are designed to pass between the adjacent non-contacting surfaces of casing 38 and cupped-out portion 90 and to straddle a dimple 92, in the manner shown in Fig. 4. Yoke 24 is curved, as at 30, to preclude blocking of the lens 39 by any portion of support 22.

In the operation of the camera of Fig. 3, having the intensifier of Fig. 1 inserted therein, with bellows contracted so that the intensifier 20 is adjacent the image-receiving area of first sheet 60, which image-receiving area is positioned substantially in what would be the focal surface of the lens 39 if said lens were in operating position, short-wave radiation incident upon the camera passes through the walls of the camera housing with almost no attenuation, small amounts of said radiation being absorbed by the image-receiving area of first sheet 60 and block 32. Radiation absorbed by said block 32 is converted into actinic fluorescent light which exposes a portion of the image-receiving area of said first sheet adjacent said block 32. The image-receiving area of said first sheet is then processed in the manner described above, the resulting developed image-receiving area of the second sheet 70 having a portion, corresponding to the portion of the image-receiving area of the first sheet 60, to which the block 32 was closely adjacent during exposure. By comparing this portion of the developed image-receiving area of the second sheet with a scale of areas of various shades of gray, said scale being graduated in roentgens, the cumulative dose of radiation incident on the camera may be evaluated. Such a scale may be conveniently situated on said camera. By exposing the image-receiving area of the first sheet in the above manner for a predetermined time, the dose per unit time may be determined.

Although the intensifier herein disclosed has been embodied in a camera of the folding type, it is to be understood that the broad concept of a camera, provided with an intensifier that enables the camera to detect and record radiation doses without interfering with normal photographic usage of said camera, is of general application.

Other intensifying means, supporting means and species of cameras, than those herein described, may embody the invention herein disclosed. One example of an alternative embodiment of the present invention is a pivoted or sliding intensifying means that is mounted adjacent an image-receiving area of a photosensitive sheet within a camera so that it may be pivoted or slid into juxtaposition with said area or may be pivoted or slid out of the optical path between the lens of said camera and said area.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a camera, a housing, a bellows, one end of said bellows being attached to said housing, means including a lens mounted on the other end of said bellows, said bellows, when in open position, defining with said housing a chamber, means for positioning a photosensitive sheet substantially in the focal surface of said lens and for defining on said photosensitive sheet a rectangular image-receiving area, said chamber providing an optical path between said lens and said area, intensifying means mounted on said first-mentioned means, said intensifying means being composed of material which emits fluorescent light actinic to said image-receiving area when subjected to X- and gamma radiation whereby, when said bellows is in closed position, said intensifying means is positioned adjacent to a portion of said image-receiving area so that radiation incident upon said intensifying means causes actinic light to be emitted from said intensifying means to produce an actinic effect on a predetermined portion of said image-receiving area and, when said bellows is in open position, said intensifying means lies outside of said optical path to permit normal photographic usage of said camera.

2. In a camera, a housing, a bellows, one end of said bellows being attached to said housing, means including a lens mounted on the other end of said bellows, said bellows, when in open position, defining with said housing a chamber, means for positioning a photosensitive sheet substantially in the focal surface of said lens and defining on said photosensitive sheet a rectangular image-receiving area, said chamber providing an optical path between said lens and said area, an intensifier mounted on said first-mentioned means, said intensifier including a block, said block being composed of a material which emits fluorescent light actinic to said image-receiving area when subjected to X- or gamma radiation, said intensifier being positioned adjacent to said lens on said first-mentioned means whereby, when said bellows is in closed position, said block is positioned adjacent said image-receiving area so that radiation incident on said block causes actinic light to be emitted from said block to produce an actinic effect on a predetermined portion of said image-receiving area and, when said bellows is in open position, said block lies outside of said optical path to permit normal photographic usage of said camera.

3. In a camera, a housing, a bellows, one end of said bellows being attached to said housing, means including a lens mounted on the other end of said bellows, said housing and bellows defining a chamber, means for positioning an image-receiving area of a photosensitive sheet in the focal surface of said lens, said chamber providing an optical path between said lens and said image-receiving area, said first-mentioned means comprising a plate which is attached to said bellows and a casing which is attached to said plate, said plate having a flat peripheral portion and an inner cupped-out portion, said cupped-out portion being attached to said casing by means of spaced dimples, areas of said casing and plate between said dimples being spaced from each other to provide vents for the passage of air into said chamber when said bellows is being expanded, and an intensifier associated with said camera, said intensifier comprising a support having a yoke and a pair of legs, the outer edge of said yoke being concavely curved with respect to the inner edge of said yoke, a block of fluorescent material supported on said yoke, said legs extending into two of said vents and straddling one of said dimples whereby, when said bellows is closed, said block is positioned adjacent said focal surface so that radiation incident on said block causes actinic light to be emitted from said block to produce an actinic effect on a predetermined portion of said image-receiving area and, when said bellows is expanded, said block lies outside of said optical path to permit normal photographic usage of said camera.

References Cited in the file of this patent

UNITED STATES PATENTS

| | | |
|---|---|---|
| 1,184,941 | Gaisman | May 30, 1916 |
| 1,420,440 | Moorhouse | June 20, 1922 |
| 2,538,511 | Fairbank | Jan. 16, 1951 |
| 2,543,180 | Land | Feb. 27, 1951 |

OTHER REFERENCES

Scintillation Counting With Anthracene, Bell et al., AECD–1889, April 20, 1948, pp. 1–6.

Physical Review, May 15, 1948, page 1210.